United States Patent [19]
Hilles

[11] 3,863,196
[45] Jan. 28, 1975

[54] ACOUSTICALLY ACTIVATED PROXIMITY SENSOR SWITCH

[75] Inventor: Lewis M. Hilles, Hingham, Mass.

[73] Assignee: Massa Corporation, Hingham, Mass.

[22] Filed: Jan. 31, 1972

[21] Appl. No.: 222,182

[52] U.S. Cl. .............................. 340/1 R, 340/258 B
[51] Int. Cl. ............................................. G01s 9/66
[58] Field of Search ............ 340/1 R, 15, 1 T, 16 C, 340/278, 280, 421, 258 B

[56] References Cited
UNITED STATES PATENTS
3,017,832  1/1962  MacDonald ........................ 340/16 C
3,283,292  11/1966  Kay ...................................... 340/1 R
3,362,009  1/1968  Midlock .............................. 340/1 T
3,675,190  7/1972  Auer, Jr. et al. ..................... 340/1 T Primary Examiner—Richard A. Farley

[57] ABSTRACT

An ultrasonic system detects the presence of a target only after it has remained in a specified target zone for a predetermined period of time. Then after the recognized target is removed a function is performed. Thus, when the target is a person, a system may be automated to operate only after the person has remained fairly stationary within a defined zone of a prescribed period of time, but the system will not be operated responsive to a stream of pedestrian traffic passing through the zone.

3 Claims, 4 Drawing Figures

ACOUSTICALLY ACTIVATED PROXIMITY SENSOR SWITCH

This invention relates to proximity sensor switches activated by the presence of a target within a predetermined zone, and more particularly to means for selectively detecting the presence of a human or other form.

There are many proximity sensors; however, in the past they have not been very selective. For example, a capacitive bridge detector merely detects movement of an object in a field. It cannot discriminate between various moving objects; nor can it detect completely stationary objects. Likewise, most optic sensors merely detect when a beam of light is either cut or reflected, and it is not important how or why the beam is cut or reflected. Thus, these prior proximity sensors cannot distinguish between a target person and a stream of pedestrian traffic. Accordingly, there is a need for a selective, proximity sensor which is able to respond only to a predetermined target which remains in a predetermined spot or area for a predetermined period of time.

There are many examples of times, places, and situations when and where a selective proximity sensor may be used as a positive identification means. This application discloses an automatic flushing valve for urinals in public rest-rooms; although, many other uses exist. Thus, one target might be a human form which remains for a predetermined time in a particular spot, such as approaching or standing in a doorway. If the human is also wearing an optical target, there can be a double identification. Likewise, the selective sensor may be tied into still other identifiers, such as key or combination locks on a door. Thus, an almost foolproof identification of persons may be accomplished.

Still other uses of selective proximity sensors will readily occur to those who are skilled in the art.

Accordingly, an object of this invention is to utilize acoustic signals for selectively detecting the presence of a predetermined target in a predetermined zone for a predetermined time period.

A further object of this invention is to utilize a directional ultrasonic sound generator adapted to deliver short repetitive bursts of ultrasonic signals toward a region within which it is desired to detect the presence of a predetermined target. Yet another object is to detect the presence of a target by means of ultrasonic signals which are reflected from the target and picked up by directional ultrasonic receiving transducers.

A still further object of this invention is to determine the distance between the target and the transducers responsive to the elapsed time between the initiation of an ultrasonic signal and its detection by an ultrasonic receiving transducer, after the signal is reflected by a target located in the path of the sound waves.

Yet another object of this invention is to detect the presence of a target in a specified region responsive to a measurement of the elapsed time between the transmission of an ultrasonic signal and the receipt of the signal after it is reflected from a target. Another object is to recognize the presence of the predetermined target in the specified zone for a predetermined period of time. Still another object is to actuate an auxiliary device immediately upon the removal of the target from the zone of recognition, after satisfying the requirement of the target's presence in the zone for the prescribed time period.

In accordance with one aspect of the invention, the presence of the target is recognized by a target interception of an acoustic signal which is sent from a directional electroacoustic transducer to the target zone and region. A preferred form of the invention employs an ultrasonic directional transmitter and a directional ultrasonic receiver, arranged side by side with their normal axes directed toward a zone or region within which the target is to be detected. However, the invention is not limited to this use of separate receiving and transmitting transducers. It may also use a single transducer acting both as a receiver and a transmitter, controlled by an appropriate transmit-receive switching device.

In one specialized embodiment of the invention, short bursts of ultrasonic frequency are repeatedly transmitted to the zone or region of interest. A receiving transducer, with its associated electronic circuitry, detects the reflection of the tone burst signals, from the surface of a target, if the target is then within the specified zone or region. In this illustrative application, the received ultrasonic tone burst echoes are electronically processed to produce a steady state d-c voltage that indicates the presence of a target in the specified zone. This d-c voltage is then processed in logic circuitry that gives an output signal which indicates that a target is present. Further electronic processing is then utilized to recognize the continued presence of the target within the specified zone or region for a predetermined period of time of, for example, a few seconds. After this pre-established threshold recognition requirement is met, the logic circuitry delivers a function voltage immediately upon the removal of the target from the prescribed region in which it was recognized. The function voltage is then utilized to accomplish any desired operation such as, for example, to activate the solenoid of an electronically activated flushing valve, or for operating any other device.

Furthermore, as a result of a unique asymmetrical recognition integrator, the inventive system can be adjusted, if desired, to tolerate repetitive passages of targets through the target zone or region. For example, a continuous stream of moving pedestrian traffic may pass through the target zone without a delivery of the end function voltage.

For a better understanding of preferred embodiments of the invention, together with further features and advantages thereof, reference is made to the accompanying description and drawings in which.

Figure 3:
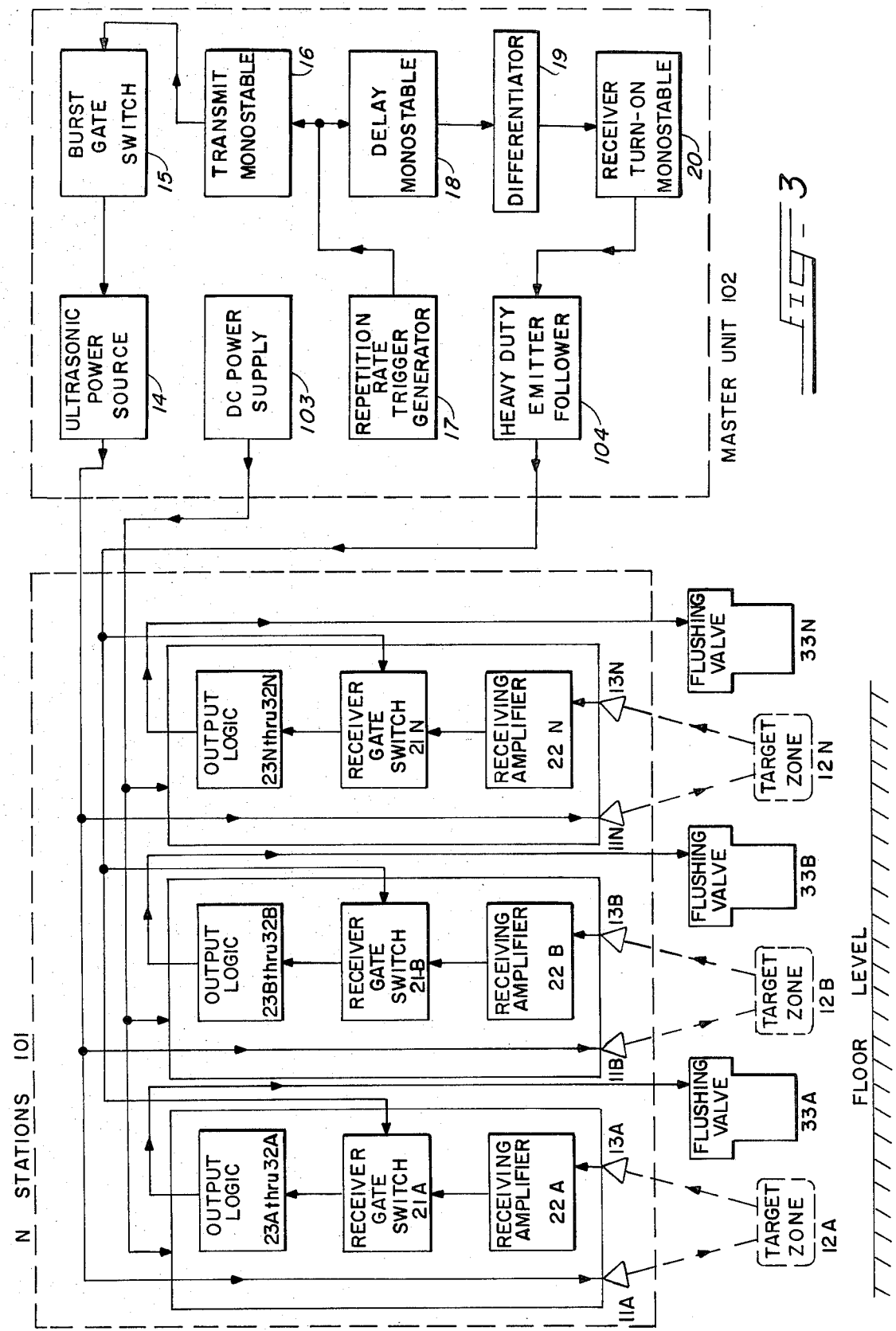
Figure 4:
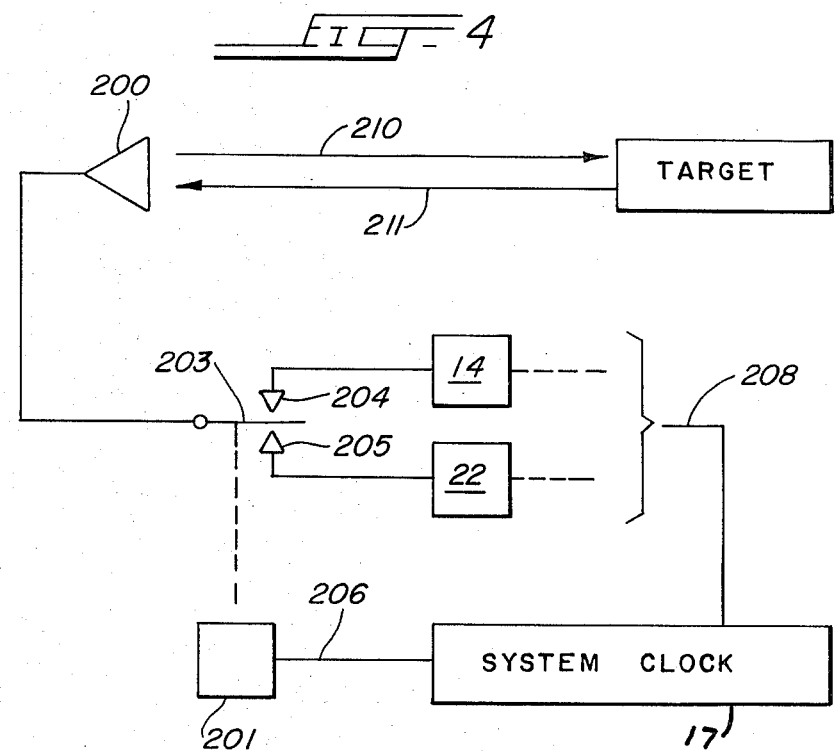

FIG. 3 is a schematic representation of another embodiment of the invention in which multiple sets of ultrasonic transducers are operated under control of a common circuit for separately indicating the presence of targets which may appear within a plurality of different specified zones or regions, each zone being associated with one pair of ultrasonic transducers; and FIG. 4 schematically illustrates how the system may use a transmitting and receiving transducer which are one and the same.

Figure 1:
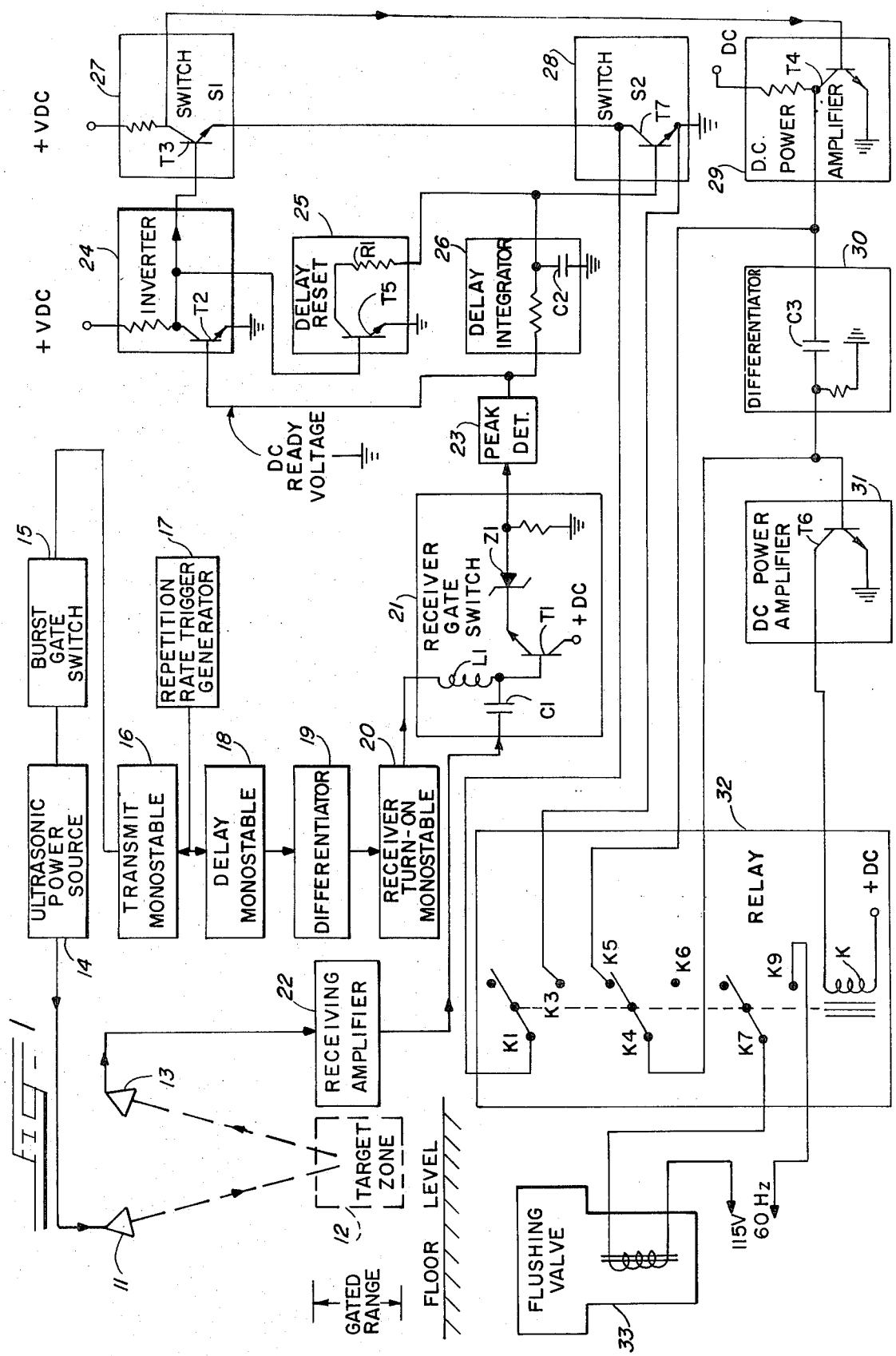
FIG. 1 is a schematic and block diagram illustrating one embodiment of the invention in which separate directional ultrasonic transmitter and receiver transducers are utilized to detect the presence of a target in a specified zone or region of interest and to ignore targets outside the specified zone.

The block diagram of FIG. 1 shows various elements 11 to 33 which are employed in one embodiment of the inventive system. FIG. 1 also includes means for the recognition of a continued presence of a target in the zone or region of interest for a specified period of time. After the system has met a pre-established time related recognition threshold requirement, a function voltage is generated immediately upon the removal of the target from the zone. This voltage is utilized to control a desired function such as, for example, the illustrated operation of a flushing valve.

Figure 2:
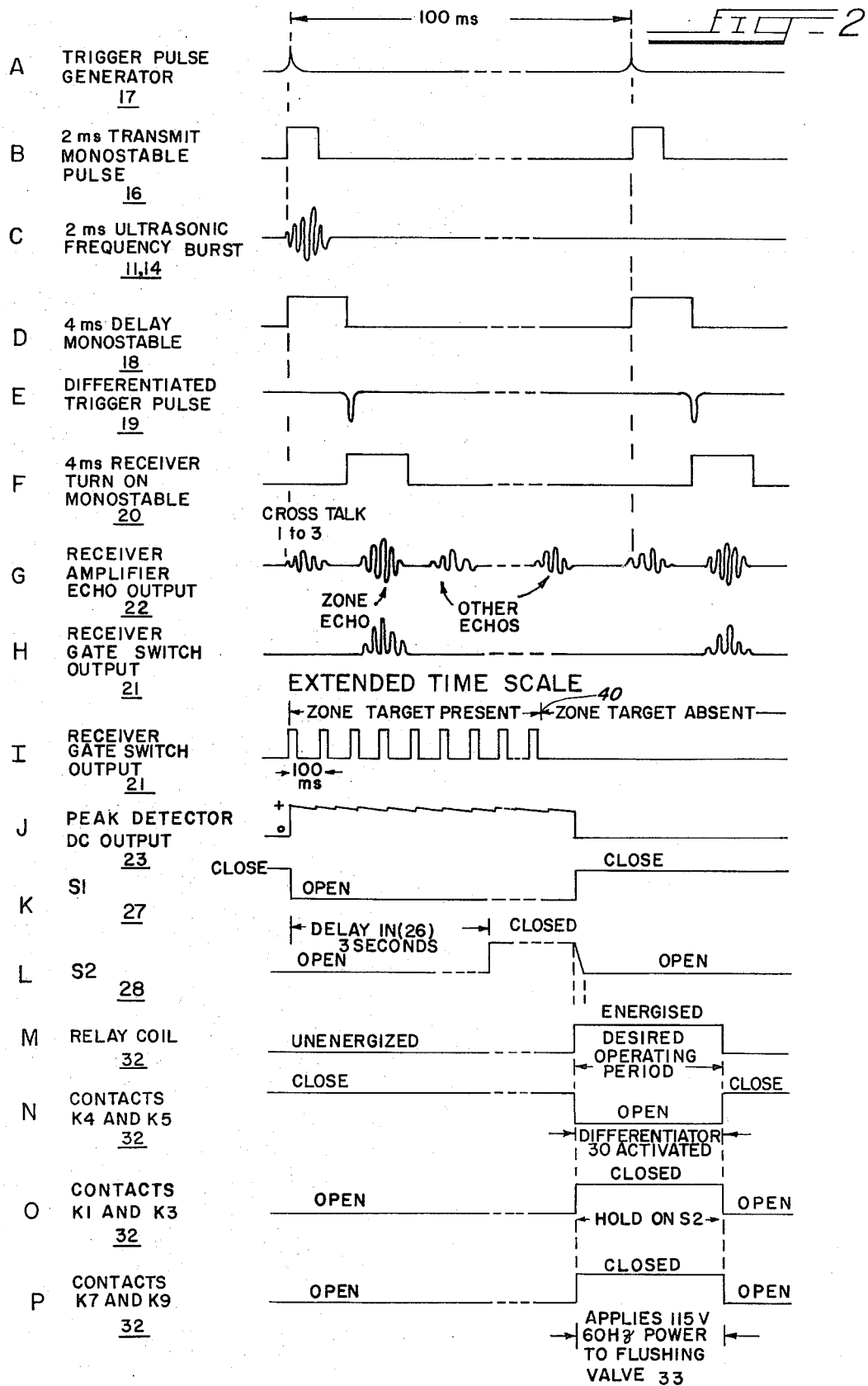
FIG. 2 is a timing diagram which graphically illustrates a sequential series of signals generated throughout the system of FIG. 1.

The time relationships of the various electrical signals that appear in FIG. 1, are shown on the timing diagrams in FIG. 2. These signals represent the functions of target recognition within the prescribed zone or region, the continued presence of the target within the zone for a specified period of time, and the final activation of an end function, such as the operation of a flushing valve as illustrated in FIG. 1.

In greater detail, a transmitting, directional, ultrasonic transducer 11 is located with its major radiating axis pointed toward approximately the center of the target zone 12. A receiving, directional, ultrasonic transducer 13 is located close to transducer 11, with its major radiating axis also pointed toward the approximate center of the target zone or region.

The system is controlled from a free-running, repetition rate, trigger generator 17 which acts as a system clock pulse source. More particularly, the clock pulse generator 17 may include any suitable oscillator, such as a unijunction transistor circuit (not shown) controlled by an R-C network. Generator 17 cyclically delivers pulses that control transmission of short bursts of ultrasonic power. Preferably, each burst has a duration in the order of two milliseconds, for example. These repetitive narrow pulses recur at a rate of about 10 pulses per second (FIG. 2,A). The output of the generator 17 is applied to a transmit monostable circuit 16, of any suitable design, which is used as a pulse stretcher, providing a pulse width of two milliseconds (FIG. 2,B).

The transmit monostable circuit 16 controls a burst gate switch 15 which turns on for a predetermined period of time. During this time, an ultrasonic power source 14 sends a burst of ultrasonic energy to the directional transducer 11 (FIG. 2,C).

The clock or trigger pulses from generator 17 also trigger a delay monostable circuit 18, in which each of the trigger pulses is stretched to have a width of about four milliseconds as illustrated in FIG. 2,D. The trailing edges of these four millisecond pulses are differentiated by a conventional differentiator circuit 19. The result is a generation of narrow trigger pulses which are delayed from the first trigger pulse by four milliseconds (FIG. 2,E). The delayed trigger pulse triggers a receiver turn-on monostable circuit 20 (FIG. 2,F) which, in turn, stretches the delayed trigger pulse out to a width of four milliseconds.

During this four milliseconds, a voltage pulse is applied through an isolating inductor L1 to the base electrode of an NPN transistor T1, which is connected in an emitter follower configuration. A zener diode Z1 is connected to bias the emitter of the transistor, as shown in the receiver gate switch 21 (FIG. 1). The voltage of the bias supplied through the zener diode Z1 is chosen to match that of the delayed pulse applied through the inductor L1.

The receiver gate switch 21 is also controlled responsive to the ultrasonic energy received by the transducer 13. More specifically, energy transmitted by the transducer 11 is reflected from a target in zone 12 to the receiver transducer 13. As a result, a signal is applied through a receiving amplifier 22 to a coupling capacitor C1.

The ultrasonic energy may appear at the output of the receiver gate switch 21 only during the presence of the delayed pulse from circuit 20. Thus, the monostable circuit 20 provides a time window of acceptance (FIG. 2,F) during which reflected ultrasonic energy (FIG. 2,H) may be detected. As a result, ultrasonic frequency echo bursts are delivered from the receiving amplifier 22 output to the base of the emitter follower T1. All other echo burst signals lying outside this time window of acceptance, are rejected.

The output of receiving amplifier 22 is hard clipped. Both the emitter bias of the receiver gate switch, transistor T1, and the delayed pulse voltage (FIG. 2,F), are chosen to match the hard clipping level. Thus, it is impossible to get false gating action responsive to very strong echo bursts, indicated as "cross talk" and "other echos" in FIG. 2,G.

The pulses out of circuit 21 resulting from the reflections of ultrasonic energy from the target zone 12 occur at the system's repetition rate, which, in this example, is 10 pps. These pulses are applied to a peak detector circuit 23, which is of a conventional type. These pulses are stored and stretched into a steady d-c voltage by the peak detector circuit 23. This d-c voltage out of circuit 23, called the "ready voltage", appears as a result of a reflection from a target within the target zone. The ready voltage is applied to both the input of a transistor inverter 24 and the input of a delay integrator 26.

The transistor T2 in the inverter 24 saturates responsive to the ready voltage, and its collector voltage is at ground or zero voltage, thus cutting off a transistor T3 in the S1 switch circuit 27. When transistor T3 turns off, its collector voltage rises, driving the transistor T4 in the d-c power amplifier 29 into saturation. At the same time, the ground or zero voltage at the output of the inverter 24 cuts off a transistor T5 in a delay reset circuit 25. When transistor T5 turns off, a low resistor bridging circuit R1 is removed from shunting a capacitor C2 in a delay integrator circuit 26. As a result, the integrator circuit 26 begins to conduct, for forward integration.

The output of the d-c power amplifier 29 becomes a ground or zero voltage, when transistor T4 turns on. Ground is applied, via contacts K4, K5 of relay 32, to the base of a transistor T6 in a d-c amplifier 31. Thus, the transistor T6 in the d-c power amplifier 31 is at cut off to prevent operation of relay 32.

At the same time that the ready voltage is applied to the input of the inverter 24, the same voltage is applied to the input of the delay integrator circuit 26. After a delay of a few seconds, the capacitor C2 charges and the voltage at the integrator 26 output drives into the base of the transistor T7, in S2 switch 28, which goes into a saturated condition. In effect, there is a closed switch S2 extending from the collector to the emitter of the transistor T7.

A removal of the target from the target zone 12 at any time after the transistor T7 is saturated, results in a functional operation. More particularly, the removal causes the transistor T1 to turn off. The ready voltage becomes zero, thus cutting off the transistor T2 in the inverter 24, which causes its collector voltage to rise toward the + d-c voltage. The rise in voltage at the collector of the inverter transistor T2 drives into the base of transistor T3 of the S1 switch circuit 27.

The base of the transistor T5 in delay reset circuit 25 is also driven into saturation by inverter circuit 24. The output voltage of the S1 switch in circuit 27 also falls to zero. As the transistor T5 turns on, a low value bridging resistance R1 is connected in parallel across the integrating capacitor C2 in the delay integrator 26.

While the integrator capacitor C2, in delay integrator 26, is discharging, switch S2 (transistor T7), remains on for a time period which is long enough to allow the ground or zero voltage output of switch S1 (transistor T3) to cut off the d-c power amplifier 29. In turn, the d-c power amplifier 31 turns on and thereby energizes the coil K of relay 32.

Responsive to an operation of the relay, contacts K1 and K3 close to place a holding circuit across the switch S2 (by shunting the transistor T7). Contacts K4 and K5 open and remove a bridging circuit across a differentiator circuit 30. Contacts K7 and K9 close to complete a power circuit across a flushing valve 33, causing the desired operation. The time constant of the differentiator circuit 30 is chosen so that the base drive to the d-c power amplifier 31 decays during a few seconds.

After this time delay, the relay 32 releases, and the relay contacts return to their normal position. The differentiator capacitor C3 discharges quickly via the contacts, K4 and K5. An opening of contacts K1 and K3 removes the bridging circuit from switch S2. The contacts K7 and K9 open to remove power from the flushing valve, thereby terminating the functional operation.

As a result of the delayed turn-on of switch S2, after the target appears in the specified zone, and the quick discharge of the integrator capacitor C3 in the delay integrator 26, due to the action of the delay reset 25, after the target disappears from the specified zone, the system will tolerate repetitive appearances and disappearances of targets in the target zone 12. As long as the appearance of the target does not persist for a sufficient time duration to close the switch S2 (transistor T7), the system does not perform the function operation.

The acceptance of signals from desired targets and rejection of targets from passing pedestrian traffic is drawn on an "EXTENDED TIME SCALE" in FIG. 2. In greater detail, FIG. 2,I shows successive pulses from the receiver gate switch 21. Each pulse results from a coincidence of an acceptance time window and an echo signal. As long as the target is stationary, each successive pulse merely recharges a capacitor in circuit 23, with no immediate effect (FIG. 2,J). If the target leaves the zone, at time 40, the sonic echoes disappear causing the pulses to stop (FIG. 2,I) their passage through circuit 21.

At this instant of time switch S1 closes. However, there was a delay of about 3 seconds in the closure of S2 due to the charging of the condenser C2 in the delay integrator 26 when the target entered the zone. If the target leaves the zone prior to this 3 second delay, S2 will remain in the open position and the closure of S1 cannot cause the end function. Furthermore, removal of the target from the zone saturates the delay reset 25 which very rapidly discharges C2 in the delay integrator 26. It is thus seen that repetitive appearances and disappearances of targets in the zone, like a continuous stream of passing pedestrian traffic, cannot cause the end function.

Thus, the described functions achieve the objectives of this invention, namely:

1. To detect the presence of a target in a specified zone;
2. To recognize the presence of a target in a specified zone after a predetermined period of time;
3. To detect the removal of the target from the specified zone once it has been recognized and responsive thereto to generate a functional signal that operates an end device for a predetermined period of time; and
4. To tolerate repetitive passages, without delay, of targets through the target zone, (like a continuous stream of pedestrian traffic), without delivery of the end function voltage.

It is possible to achieve a multi-station application of an acoustically operated proximity switch with a common control system, as illustrated in the schematic diagram of FIG. 3. In this illustrative example of a multi-station application, a master unit 102 includes a single ultrasonic power source 14, which simultaneously supplies ultrasonic power to a group of N stations 101.

A single clock pulse source or repetition rate trigger generator 17 and burst gate switch 15, operate through a transmit monostable 16 to control the power source 14. Likewise, a delay monostable circuit 18 and a receiver turn-on monostable 20, serve the same functions as the corresponding elements described above in connection with the single station application of FIG. 1. A heavy duty transistor 104, used in an emitter follower configuration, is utilized for supplying the receiver turn-on gate to the N stations 101. A common d-c power supply 103 is utilized for supplying power to the flushing device at each of the N stations.

During operation of the multi-station system, each of the transmit transducers 11A, 11B, ... 11N, is simultaneously pulsed in unison from the common ultrasonic power source 14. The receiver turn-on gate switch 21 at each station selects the timing window for identifying the target in the zone 12 for each individually associated one of the stations, as was described in connection with FIG. 1. The multi-station operation is thereby achieved by employing at each of the stations only a transmitting transducer, such as shown at 11A, a receiving transducer, such as shown at 13A, and the receiving and logic circuitry, such as shown at 21A—22A. Thus, in the multi-station operational system as illustrated in FIG. 3, a considerable economy in cost is achieved by the common control use of some of the major operational components identified as the master unit 102.

As shown in FIG. 4, the system may use the same electroacoustic transducer 200 as a transmitting or a receiving transducer. The transducer 200 is connected through a switching circuit. As here symbolically shown, the switching circuit comprises means 201 for sequentially connecting a circuit at 203, 204 to the transmitting logic 14 and to the receiving logic 22 at 205. The circuits connected before and after the logic circuits 14 and 22 are as shown in FIG. 1. The switch 201 and logic circuitry are synchronized by the system clock 17 acting through circuits 206, 208. When the switch 203, 204 is closed, transducer 200 acts as a transmitter, sending sound 210. When the switch 203, 205 is closed, it acts as a receiving transducer, accepting reflected sound 211.

Block diagram representations have been used for the electronic functions throughout the descriptions of the various illustrative embodiments of this invention because the various electronic functions represented by the block diagrams utilize conventional circuitry well known to those skilled in the art. Other well known specific circuit details may be used for performing the individual functions illustrated by the block diagrams.

The invention is related to the basic systems, which have been described, for achieving a unique acoustically controlled proximity switch, which only detects the presence of a target when it appears within a predefined target zone and operates upon an identification of the target's continued presence in the zone.

This invention has been described in connection with several particular embodiments which have been chosen for the purpose of illustrating the basic principles involved. However, it will be obvious to those skilled in the art that numerous deviations will be possible from the particular embodiments shown. Therefore, the invention is not limited thereto, but includes all equivalents which fall within the spirit and scope of the appended claims.

I claim:

1. A sonically operated urinal flushing system comprising means for sonically detecting a sonic energy reflecting target in a predetermined zone, means for measuring a predetermined time period after said detection of said target in said zone, means for detecting the removal of said target from said zone, and means responsive jointly to said detection of the removal of said sonic energy reflecting target from said predetermined zone and to said time measuring means for flushing said system after said target has been in said zone for said predetermined time period.

2. The system of claim 1 and means for inhibiting response to targets which are not in said zone for said predetermined time period.

3. The system of claim 2 wherein there are a plurality of said flushing systems, and common control means for selectively operating individual ones of said flushing systems.

* * * * *